Oct. 21, 1941.　　　M. A. MIKESH　　　2,260,260
WELDING APPARATUS
Filed July 25, 1940　　　2 Sheets-Sheet 1
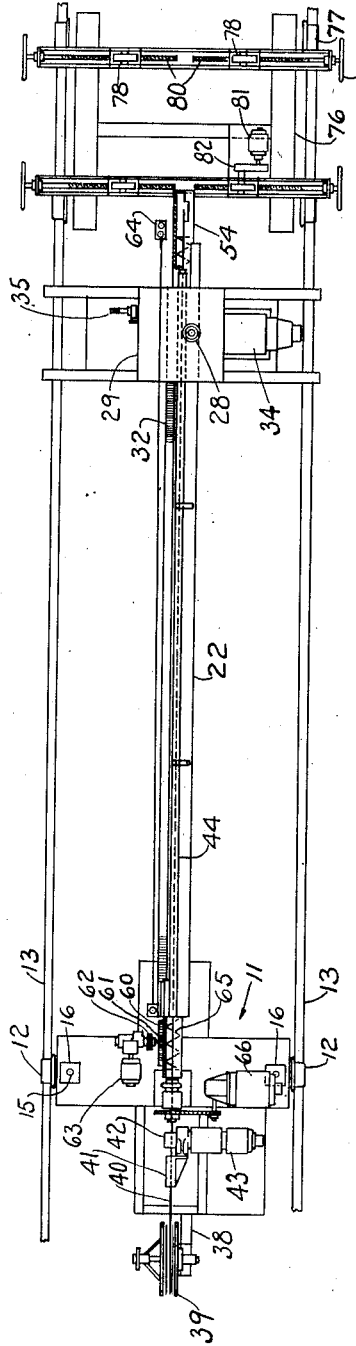
MARTIN A. MIKESH
INVENTOR
BY Virgil F. Davies
ATTORNEY

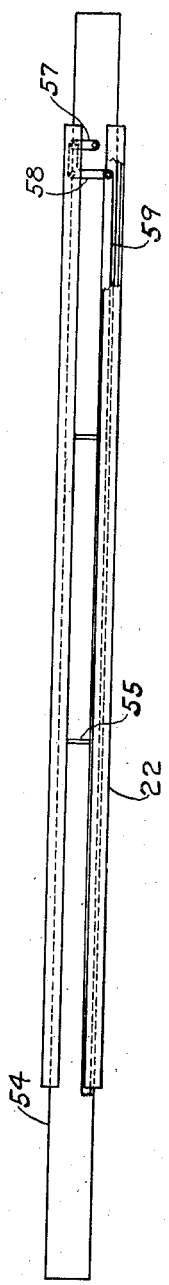
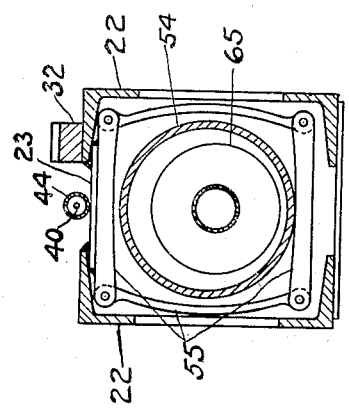

Patented Oct. 21, 1941

2,260,260

UNITED STATES PATENT OFFICE 2,260,260

WELDING APPARATUS

Martin A. Mikesh, Lawrenceville, N. J., assignor to The M. W. Kellogg Co., New York, N. Y., a corporation of Delaware Application July 25, 1940, Serial No. 347,390

11 Claims. (Cl. 219—6)

This invention relates to electric welding apparatus and more particularly to electric welding apparatus for use in welding within elongated tubular articles.

When tubular articles such as shells, conduits, pipes, etc., are manufactured from flat plate by arc welding, the seam welds required to unite the edges of the rolled plate are made entirely, or to a major extent, from the outside. When the service conditions for which the articles are designed are not severe, tubular articles whose seams have been welded entirely from the outside are acceptable. When the welding is performed entirely from the outside the condition of the joints at the inside surfaces of the articles is poor. For this reason when the articles are intended for severe service it is necessary to bring the condition of the joints at the inside surfaces to the same condition as those at the outside surfaces. This is accomplished by chipping, or otherwise removing, metal along the joints until all of the unbonded metal is removed and sound weld metal is reached. The groove thus formed is later filled by hand welding.

The outside welding may be performed by open arc welding, i. e., electric arc welding in which the arc is visible, or by submerged arc welding, i. e., electric arc welding in which the arc is submerged beneath the surface of a blanket of protective flux. When open arc welding is employed the outside weld may be made by hand or by the use of automatic welding machines. When submerged arc welding is employed automatic welding machines are always used.

Whether the outside welding be performed by open arc or submerged arc welding, at present the inside welding is always performed by open arc welding as a hand operation. This increases the manufacturing costs substantially and imposes a limit on the diameter of the articles that can be made. For, unless the articles are comparatively short they must be of sufficient size to allow a man to work within them in an efficient manner.

It is an object of this invention to provide novel welding apparatus of general use which is particularly adapted for welding in the interior of elongated tubular articles.

It is also an object of this invention to provide novel welding apparatus by means of which inside beads may be deposited in tubular articles by flux submerged arc welding.

It is also an object of this invention to provide novel welding apparatus, for welding within elongated tubular articles by submerged arc welding, whose actuating elements are located and controlled at a point removed from the point at which the welding takes place whereby the elements of the apparatus that enter the article during welding are reduced to a minimum number and compass and welding may be carried on within articles of much smaller size than at present.

The further objects and advantages of the invention will be apparent from a consideration of the following description of a present preferred form of the apparatus embodying the invention, taken with the accompanying drawings, in which, Fig. 1 is a side elevation of the apparatus arranged for welding within a tubular article;

Fig. 2 is a plan view of the apparatus with parts removed to better show its construction.

Fig. 3 is a bottom fragmentary view showing construction details of the apparatus, and Fig. 4 is a section view taken on lines 4—4 of Fig. 1.

The apparatus of the invention is of general application and may be used for inside, or outside welding, with the open electric arc or with the flux submerged electric arc. For the purpose of this disclosure the apparatus is shown as arranged for inside welding with the flux submerged electric arc.

Welding machine 10 includes a truck 11 carried on wheels 12 for movement back-and-forth on rails 13. Truck 11 includes a platform 14 that is vertically adjustable relative to rails 13.

The vertical adjustment of platform 14 is effected by the rotation, as by a hand-wheel not shown, of screws 15. Screws 15 have their top ends unthreaded. The unthreaded ends rotate in a combined thrust and radial bearing 16. Sprockets are splined to screws 15 below bearings 16. The hubs of the sprockets are made sufficiently large to afford proper bearing on the thrust face of bearing 16. The sprockets are connected by an endless chain, not shown, so that the rotation of one screw 15 is duplicated by the other. Screws 15 are threaded in nuts 17 attached to the top ends of pipes 18. Pipes 18 telescope in larger pipes 19 and are fastened at their bottom ends to the axle 20 on which wheels 12 are mounted. This arrangement for securing the vertical adjustment while satisfactory may be substituted by any comparable arrangement that will give the same results.

A pair of angles 21 are fastened to platform 14 and between them are supported the ends of a pair of channels 22. Channels 22 are fastened to angles 21 as by welding. Channels 22 are kept together as by straps 23 that are attached to them, by welding, at spaced points along their length.

The unit that is made up of channels 22 is supported on, and is adapted to move over, rollers 24 mounted in vertically adjustable carriage 25. Carriage 25 is supported for vertical adjustment in fixed stand 26. A screw 27 is threaded through a nut 28 that rests on the top plate 29 of stand 26. The other end of screw 27 passes through top plate 30 of carriage 25. A split collar 31 is attached to plate 30 and encircles a reduced portion of screw 27 so that when screw 27 is rotated, as by a hand-wheel not shown, in the proper direction carriage 25 can be raised as desired. When screw 27 is rotated in the opposite direction the weight of carriage 25 will cause it to move downwardly.

To the top of one of channels 22 is fastened an elongated rack 32 which meshes with a pinion 33 that is driven through a suitable gear train, in either direction, by a reversible variable speed motor 34. For adjustment and similar purposes pinion 33 may be driven by hand by the rotation of shaft 35 through a hand-wheel, not shown. When pinion 33 is rotated channels 22 and truck 11, to which the channels are fastened, are moved as a unit in the desired direction relative to stand 26.

Speed indicator 36, preferably calibrated to indicate the feet per minute travel of channels 22, for motor 34 may be located on carriage 25 or at any convenient point easily accessible to the operator; for the purposes of this disclosure, speed indicator 36 is shown on panel board 37. The controls and current supply lines for motor 34 and the other motors included in the apparatus have not been shown and will not be described in detail as these elements are all well known and it is well within the ability of the ordinary skilled workers in the art to arrange them as required. The rheostats, switches, etc., included in the motor controls will be considered as located in back of panel 37 with their operating knobs, handles, etc., projecting through so as to be easily accessible to the operator. The flexible shaft for speed indicator 36 has also been omitted from the drawings.

A reel support 38 is provided at the back end of truck 11. On support 38 is mounted reel 39 upon which is wound electrode wire 40. Wire 40 passes from reel 39 through a box 41, which contains a series of straightening rollers, to the feed rollers that are housed in housing 42. The feed rollers are driven by electrode feed motor 43. Wire 40 passes from the feed rollers through a conduit 44 to bending rollers 45 and from thence through contact device 46 toward work 47. Contact device 46 includes a series of straightening rollers followed by a series of contact shoes.

The welding current, which may be A. C. or D. C. current, may be obtained from a generator or from a transformer or from a connection to a welding current source, external to the apparatus. In any case the welding current supply will be considered as located in back of panel board 37 with one side connected to cable 48 and the other to cable 49. Cable 48 is connected to the contact shoes of contact device 46 while cable 49 is grounded, to complete the welding circuit the work is also grounded through a cable 49. It is to be understood that cable 48 is of sufficient length to allow full movement of truck 11 relative to stand 26. In practice it is found preferable to carry cable 48 on the side of one of channels 22.

Motor 43 is of the variable speed type ordinarily used in welding heads. Control arrangements are provided, electrically connected to the welding current circuit, which operate to adjust automatically the rotation of motor 43 to maintain an electric discharge from the end of wire 40 of substantially constant predetermined characteristics. These control arrangements may also include means for maintaining characteristics of the welding current at predetermined valves. Control arrangements of this character are well known in the art and consequently will not be disclosed in detail here. The control arrangements for the purposes of this disclosure will be considered as being located in back panel board 37. An ammeter 51 and a voltmeter 52 are provided on panel board 37 to indicate respectively the amperage and the voltage of the electric current discharge.

A cradle 53 is fastened to platform 14 to support one end of tube 54. Cradle 53 is such that while tube 54 is restrained against longitudinal movement a limited transverse movement is possible. Tube 54 is housed in channels 22 for the major portion of its length. Tube 54 is supported for limited transverse movement relative to channels 22 by the arrangement of links 55 shown in Fig. 4. The link arrangements 55 are spaced along the length of tube 54.

Contact device 46 is carried by tube 54 adjacent its free end. At the free end of tube 54 is positioned a vertically adjustable pointer 56 that is in line with the discharge end of electrode wire 40 and indicates the position of the discharge end of electrode 40 during welding.

For final adjustment prior to welding and adjustment during welding it is often necessary to move the discharge end of electrode 40 laterally; tube 54 is arranged to provide for such movement. A pivot pin is fastened adjacent the free end of tube 54. On this pin is pivoted one end of link 57. The other end of link 57 is pivoted to one end of bell crank 58 which in turn is pivoted on a pin fastened to one of the channels 22. The other end of bell crank 58 has one end of a rod 59 connected to it. The other end of rod 59 is connected to a rack 60. Rack 60 is driven by a pinnion 61 that is driven through a slip clutch 62 by motor 63. Motor 63 is reversible, its energizing circuit is controlled by means of a switch 64 which is preferably located near the free end of tube 54. Thus by observing pointer 56 and energizing motor 63 to rotate in the proper direction the discharge end of electrode wire 40 may be quickly and easily brought to any desired position within the limit of movement of tube 54.

Tube 54 houses an elongated screw conveyor 65, the shaft of which is journalled in diaphragms at the ends of tube 54. At the truck end the shaft supporting diaphram is positioned at approximately the end of tube 54 while at the free end the shaft supporting diaphragm is positioned inwardly of the end. The shaft of conveyor 65 is driven, through a suitable train of gears, by motor 66.

On the truck end of tube 54 is supported a flux hopper 67. The chosen flux in particle form passes from hopper 67, through tube 68 at its bottom, into the truck end of tube 54 to be conveyed by screw conveyor 65 to the free end of tube 54. At the free end of tube 54 is provided a pair of tubes 69, one on each side of contact device 46, which conduct the flux to the work and deposit it at each side and ahead of the discharge end of electrode wire 40.

Pointer 56, as stated above, is in line with the discharge end of electrode 40 along the line of movement of channels 22 and indicates the position of the discharge end of the electrode 40 relative to the center line of a longitudinal seam. Since the distance between pointer 56 and the discharge end of electrode 40 is fixed, pointer 56 may also be used to indicate the position of the discharge end of electrode 40 relative to the centerline of a girth seam or other seam at an angle to path of movement of channels 22. For this purpose however pointer 70 is provided. Pointer 70 is vertically adjustable in carriage 71, which can be positioned as desired on bar 72. Pointer 70 may be aligned with the discharge end of electrode 40 or may be spaced from it to indicate the position of the discharge end of electrode 40.

For further convenience pointer 73 is also provided. Pointer 73 is vertically adjustable and is carried by carriage 74 that is positionable along bar 75. By providing a suitable index mark and positioning pointer 73 over this mark at the beginning of the welding operation the operator can quickly tell how far, at any instant, the discharge end of the electrode 40 has progressed into the work. Also, when welding is performed that requires back-and-forth movement of the discharge end of the electrode, pointer 73 may be used to follow the pattern of the movement. Other uses for pointer 73 will readily occur to any skilled operator.

When straight longitudinal seams are welded work 47 may be supported on any convenient support as no movement of the work is required. When girth seams, or other welding that takes place on a line at an angle to the longitudinal axis of work 47, are welded work 47 is preferably supported on truck 76. Wheels 77 provide for movement of truck 76 along rails 13 so that it may be positioned as required relative to stand 26. On truck 76 are mounted two, or more, pairs of work supporting rollers 78. Rollers 78 are positionable relative to the center line of truck 76 through hand-wheels 79 and screws 80. One of rollers 78 on one side of truck 76 is driven by variable speed motor 81 through speed reducer 82. Reducer 82 and motor 81 are mounted to be easily movable back-and-forth with their roller 78. Because of the adjustable rollers 78 the diameter of the work handled may vary greatly; rollers 78 also provide a means for raising or lowering the surface of work 47 on which the welding is performed relative to the bottom of contact device 46.

The various electrical circuits are isolated by insulation and insulation is provided wherever necessary to assure safe and satisfactory operation of the apparatus. To simplify the disclosure, the insulation has not been disclosed in detail as it is not per se a part of the invention and it is well within the skill of the worker in the art to properly insulate the apparatus disclosed.

In operation, work 47 is positioned on rollers 78 and these adjusted to space the inside surface of work 47 as required from the bottom of contact device 46. When this spacing is not obtainable by adjustment of rollers 78 carriage 25 and platform 14 are moved vertically to give the required spacing. Channels 22 are then moved, either by hand rotation of shaft 35 or by energizing motor 34, to bring the end of electrode wire 40 to the point at which welding is to begin. The free end of tube 54 is then moved laterally, by the energization of motor 63, as required to bring the end of electrode 40 over the starting point.

When a longitudinal seam is to be welded, it is not only necessary to set the current controls and the arc control arrangements that control the functioning of feed motor 43, but the controls of motor 34 must also be set to move the discharge end of electrode 40 into work 47 at the required rate. When a girth seam is to be welded, the controls of motor 34 are left unset but the controls of motor 81 are set to rotate work 47 at the rate required to give the desired rate of movement between the discharge end of electrode 40 and work 47. When the welding is to take place on an angle, other than a right angle, to the longitudinal axis of work 47 the controls of both motor 34 and motor 81 as set are required to progress the discharge end of electrode 40 along the required path at the required rate.

After the proper settings have been made electrode 40 is fed until it approaches the surface of work 47. The feed is stopped and an arc starter such as a wad of steel wool, a nail, etc., is placed between the electrode end and the surface of the work. The energizing circuit of flux feed motor 66 is then closed and after sufficient flux has been deposited to properly cover the end of electrode 40 the welding operation is started by closing the welding current supply circuit, the circuit of feed motor 43 and either or both of the circuits of motors 34 and 81.

During welding the position of the discharge end of electrode 40 may be adjusted from time to time as required by energizing motor 63, or motor 34 or both.

A machine, as above described, has been constructed which is capable of welding a seam 40-feet long in a pipe 12 inches in diameter. The 40-foot length limit was not imposed by the machine but rather by the character of conduits, pipes, etc., which are ordinarily manufactured. A machine in accordance with the invention can be constructed to weld much greater lengths as the only problem presented is that of supporting the weight of the machine between the welding end and stand 26. This problem can be solved as for instance by providing a castor, that is intended to bear on the work, adjacent contact device 46, or such a castor and as many more as required between device 46 and stand 26, the latter castors to be positioned during the movement of the welding head as required. A machine in accordance with the invention can also be designed, by reducing the size of the parts to weld within pipes of less than 12 inches in diameter.

It is to be noted that when performing inside welds with the use of the flux submerged arc the removal of unfused metal is not required for by the proper control of the penetration sound metal throughout the joint can be obtained.

I claim:

1. In metal fusing apparatus, a stand, a support member vertically movable in said stand, an elongated member mounted for longitudinal movement on said support member, a welding current contact device carried by said elongated member adjacent one end thereof, support means longitudinally movable with said elongated member supporting the other end of said elongated member, said support means being vertically adjustable, and electrode feed means mounted on said support means adapted to feed an electrode through said contact device toward a work-piece as required to maintain an electrical discharge across the discharge end of the electrode and the work-piece of substantially constant predetermined characteristics.

2. In metal fusing apparatus, a fixed stand, a support member in said stand vertically adjustable relative thereto, an elongated member mounted for longitudinal movement on said support member, a welding current contact device carried by said elongated member adjacent one end thereof, a carriage member connected to one end of said elongated member and movable therewith, said carriage member being vertically adjustable, electrode feed means mounted on said carriage member adapted to feed an electrode through said contact device toward a work-piece as required to maintain an electrical discharge across the discharge end of the electrode and the work-piece of substantially constant predetermined characteristics, and means on said elongated member adapted to guide the electrode in its movement from said feed means to said contact device.

3. In metal fusing apparatus, a fixed stand, a support member in said stand vertically adjustable relative to said stand, an elongated member mounted for longitudinal movement on said support member, a welding current contact device carried by said elongated member adjacent one end thereof, a truck member including a vertically adjustable support, the other end of said elongated member being connected to said support whereby said elongated member and said truck member are longitudinally movable as a unit and said support and said other end of said elongated member are vertically adjustable as a unit, electrode feed means mounted on said support adapted to feed an electrode through said contact device toward a work-piece as required to maintain an electrical discharge across the discharge end of the electrode and the work-piece of substantially constant predetermined characteristics, and means mounted on said support member adapted to drive said elongated member in either direction at predetermined rates of speed.

4. In metal fusing apparatus, a fixed stand, a support member in said stand vertically adjustable relative to said stand, an elongated member mounted for longitudinal movement on said support member, a welding current contact device carried by said elongated member adjacent one end thereof, a truck member including a vertically adjustable support, the other end of said elongated member being connected to said support whereby said elongated member and said truck member are longitudinally movable as a unit and said support and said other end of said elongated member are vertically adjustable as a unit, electrode feed means mounted on said support adapted to feed an electrode through said contact device toward a work-piece as required to maintain an electrical discharge across the discharge end of the electrode and the work-piece of substantially constant predetermined characteristics, a variable speed reversible motor mounted on said support member, and a gear train including a rack carried by said elongated member for translating the rotary movement of said motor into longitudinal movement of said elongated member.

5. In metal fusing apparatus, a fixed stand, vertically adjustable carriage means in said stand, an elongated support member mounted for longitudinal movement on said carriage means, vertically adjustable support means, one end of said support member being connected to said support means whereby said support member and said support means are movable as a unit, an elongated supported member carried by said elongated support member and mounted for limited transverse movement relative thereto, one end of said supported member being fixed on said vertically adjustable support means against longitudinal movement, a welding current contact device carried by said supported member at the other end thereof, and electrode feed means mounted on said vertically adjustable support means adapted to feed an electrode through said contact device as required to maintain a discharge of substantially constant characteristics through a gap between the discharge end of the electrode and a work-piece.

6. In metal fusing apparatus, a fixed stand, vertically adjustable carriage means in said stand, an elongated support member mounted for longitudinal movement on said carriage means, vertically adjustable support means, one end of said support member being connected to said support means whereby said support member and said support means are movable as a unit, an elongated supported member carried by said elongated support member and mounted for limited transverse movement relative thereto, one end of said supported member being fixed on said vertically adjustable support means against longitudinal movement, means connected to said supported member adjacent the other end thereof and terminating on said vertically adjustable support means adapted to move the other end of said supported member transversely relative to said support member, means mounted on said vertically adjustable support means adapted to actuate said connected means, a welding current contact device carried by said supported member at the other end thereof, and electrode feed means mounted on said vertically adjustable support means adapted to feed an electrode through said contact device as required to maintain a discharge of substantially constant characteristics through a gap between the discharge end of the electrode and a work-piece.

7. In metal fusing apparatus a fixed stand, vertically adjustable carriage means in said stand, an elongated frame member mounted for longitudinal movement on said carriage means, a truck including vertically adjustable support means, one end of said frame member being connected to said support means whereby said truck and said member are movable as a unit, a supported member carried by said frame at spaced points, links at each of said spaced points connected to said frame supporting said supported member for limited transverse movement relative to said frame, one end of said supported member being held against longitudinal movement on said support means, a system of levers connected to said frame and to said supported member adjacent the other end thereof for moving said supported member transversely relative to said frame, a rack on said support means, an elongated connecting member connecting said lever system and said rack, a reversible motor on said support means, a pinion driven by said motor adapted to drive said rack, a welding current contact device carried at the other end of said supported member, and electrode feed means on said support means positioned adjacent said other end of said supported member, said electrode feed means being adapted to feed an electrode through said contact device as required to maintain a discharge of substantially constant characteristics through a gap between the discharge end of the electrode and a work-piece.

8. In metal fusing apparatus, a fixed stand, vertically adjustable carriage means in said stand, an elongated frame member mounted for longitudinal movement on said carriage means, vertically adjustable support means having one end of said frame member fastened thereto, an elongated tubular member supported on said frame member, one end of said tubular member being carried on said adjustable support means, conveyor means in said tubular member adapted to convey flux material in particle form from said one end of said tubular member to the other end thereof, a welding current contact device carried by said tubular member adjacent said other end thereof, electrode feed means on said support means adapted to feed an electrode through said contact device to maintain a welding current discharge of predetermined characteristics from the discharge end of the welding electrode, and tubular means opening into said other end of said tubular member adapted to pass flux material onto the work-piece around and in the path of the welding electrode.

9. In metal fusing apparatus, a stand, vertically adjustable carriage means in said stand, an elongated frame member mounted for longitudinal movement on said carriage means, a truck member having vertically adjustable support means thereon fastened to one end of said frame member, an elongated tubular member carried by said frame member and having one end connected to said support means, conveyor means in said tubular member adapted to feed flux material in the particle form from said one end to the other end of said tubular member, a welding current contact device carried adjacent said other end of said tubular member, electrode feed means on said support means adapted to feed a welding electrode through said contact device toward a work-piece, tubular means opening into said tubular member adapted to pass flux material onto the work-piece around and in the path of the welding electrode, and indicator means carried at said other end of said tubular member aligned with the discharge end of the welding electrode in its path of travel to indicate the position of the discharge end of the electrode when it is submerged beneath the flux material.

10. In metal fusing apparatus, a stand, vertically adjustable carriage means in said stand, an elongated frame member mounted for longitudinal movement on said carriage means, a truck member having vertically adjustable support means thereon fastened to one end of said frame member, an elongated tubular member carried by said frame member and having one end connected to said support means, conveyor means in said tubular member adapted to feed flux material in the particle form from said one end to the other end of said tubular member, a welding current contact device carried adjacent said other end of said tubular member, electrode feed means on said support means adapted to feed a welding electrode through said contact device toward a work-piece, tubular means opening into said tubular member adapted to pass flux material onto the work-piece around and in the path of the welding electrode, and indicator means carried at said other end of said tubular member and positionable along a line parallel to the line of movement of the discharge end of the electrode to indicate the position of the discharge end of the electrode.

11. In metal fusing apparatus, a fixed stand, an elongated support member mounted for longitudinal movement in said stand, movable support means, one end of said support member being connected to said support means whereby said support member and said support means are movable as a unit, an elongated supported member carried by said elongated support member and mounted for limited transverse movement relative thereto, one end of said supported member being held on said support means against longitudinal movement, a welding current contact device carried by said supported member at the other end thereof, electrode feed means for feeding an electrode through said contact device, and means for moving said other end of said supported member transversely of said supporting member to adjust the position of said contact device.

MARTIN A. MIKESH.